US008165912B2

(12) United States Patent
Dasika

(10) Patent No.: US 8,165,912 B2
(45) Date of Patent: Apr. 24, 2012

(54) METHODS AND SYSTEMS FOR PORTFOLIO INVESTMENT THESIS BASED ON APPLICATION LIFE CYCLES

(75) Inventor: Prasad Dasika, Odenton, MD (US)

(73) Assignee: Ciena Corporation, Linthicum, MD (US)

( * ) Notice: Subject to any disclaimer, the term of this patent is extended or adjusted under 35 U.S.C. 154(b) by 848 days.

(21) Appl. No.: 12/173,976

(22) Filed: Jul. 16, 2008

(65) Prior Publication Data

US 2010/0017243 A1 Jan. 21, 2010

(51) Int. Cl.
*G06Q 10/00* (2006.01)
(52) U.S. Cl. .................... 705/7.36; 705/7.29
(58) Field of Classification Search .......... 705/7.36, 705/7.29
See application file for complete search history.

(56) References Cited

U.S. PATENT DOCUMENTS

| | | | | |
|---|---|---|---|---|
| 5,208,765 | A * | 5/1993 | Turnbull | 702/84 |
| 5,446,890 | A * | 8/1995 | Renslo et al. | 1/1 |
| 5,552,995 | A * | 9/1996 | Sebastian | 700/97 |
| 6,044,354 | A * | 3/2000 | Asplen, Jr. | 705/7.13 |
| 7,010,472 | B1 * | 3/2006 | Vasey-Glandon et al. | 703/6 |
| 7,533,035 | B1 * | 5/2009 | Abend et al. | 705/7.36 |
| 7,672,921 | B1 * | 3/2010 | Clay et al. | 706/45 |
| 7,711,596 | B2 * | 5/2010 | Cristol | 705/7.36 |
| 7,757,203 | B2 * | 7/2010 | Scholl et al. | 717/102 |
| 7,778,720 | B2 * | 8/2010 | Alse | 700/103 |
| 7,840,944 | B2 * | 11/2010 | Brunswig et al. | 717/124 |
| 7,899,756 | B2 * | 3/2011 | Rizzolo et al. | 705/300 |
| 7,966,212 | B2 * | 6/2011 | Kasravi et al. | 705/7.32 |
| 7,983,952 | B1 * | 7/2011 | Dillon | 705/26.7 |
| 2002/0072956 | A1 * | 6/2002 | Willems et al. | 705/10 |
| 2002/0165765 | A1 * | 11/2002 | Sommerfeld et al. | 705/14 |
| 2003/0055761 | A1 * | 3/2003 | Sekimoto | 705/35 |
| 2003/0149610 | A1 * | 8/2003 | Rowan et al. | 705/10 |
| 2004/0064358 | A1 * | 4/2004 | Hill et al. | 705/10 |
| 2004/0230464 | A1 * | 11/2004 | Bliss et al. | 705/7 |
| 2005/0125272 | A1 * | 6/2005 | Hostetler | 705/7 |
| 2006/0224437 | A1 * | 10/2006 | Gupta et al. | 705/10 |
| 2007/0050235 | A1 * | 3/2007 | Ouimet | 705/10 |
| 2007/0150293 | A1 * | 6/2007 | Dagnino | 705/1 |
| 2007/0192170 | A1 * | 8/2007 | Cristol | 705/10 |
| 2008/0133316 | A1 * | 6/2008 | Sarkar | 705/10 |
| 2008/0255693 | A1 * | 10/2008 | Chaar et al. | 700/97 |
| 2009/0089111 | A1 * | 4/2009 | Walker et al. | 705/7 |
| 2011/0112887 | A1 * | 5/2011 | Rizzolo et al. | 705/7.28 |

OTHER PUBLICATIONS

Cox, William E., Jr; "Product Life Cycles as Marketing Models", (Oct. 1967), The Journal of Business, vol. 40, No. 4. pp. 375-384.*
"The life cycle dimension of new product development performance measurement" P Suomala—International Journal of Innovation . . . , 2004—webhotel2.tut.fi.*
Full life-cycle support for end-to-end processes B Steffen . . . —Computer, 2007—ieeexplore.ieee.org.*

(Continued)

*Primary Examiner* — Jonathan G Sterrett
(74) *Attorney, Agent, or Firm* — Clements Bernard PLLC; Christopher L. Bernard; Lawrence A. Baratta, Jr.

(57) ABSTRACT

The disclosure provides a product/service portfolio investment calculation methodology based on an application life cycle. The present invention defines an application life cycle with a plurality of phases, and provides a mechanism to define a location within the application life cycle improving product and service investment decisions. In an exemplary embodiment, the present invention maps the application life cycle with respect to telecommunications and datacommunications products and services.

12 Claims, 13 Drawing Sheets

OTHER PUBLICATIONS

Tricks and traps of initiating a product line concept in existing products C Ebert . . . —2003—computer.org.*

Software Product Lifecycle Management Using Axiomatic Approach [PDF] from axiomaticdesign.com Sh Do—. . . -3rd International Conference on Axiomatic Design . . . , 2004—axiomaticdesign.com.*

"Setting the PACE in product development: A Guide to Product and Cycle Time Excellence", McGrath, Michael; Butterworth-Heineman, pp. 1-177.*

"Electronic part life cycle concepts and obsolescence forecasting" [PDF] from umd.edu R Solomon, PA Sandborn . . . —. . . , IEEE Transactions on, 2000—ieeexplore.ieee.org.*

* cited by examiner

| | Parameter | Rating Score Key | Weight | Rating | Total score |
|---|---|---|---|---|---|
| 1 | Number of telecom service providers offering this application/service (in a geography) | Very few = 1, Several = 5, Every SP = 10 | | | 0 |
| 2 | Number of articles and messaging from vendors on the network architecture to roll out the application/service | Very few = 1, Several = 5, Every SP = 10 | | | 0 |
| 3 | Effort being spent by service providers to define the application and how to charge for it | A lot = 1, Some = 5, Already defined = 10 | | | 0 |
| 4 | Average industry analyst projected growth rate for the equipment needed to support the infrastructure | High growth rate = 1, Flat market = 5, declining = 10 | | | 0 |
| 5 | # of vendors, new and established, vying to build the infrastructure | A lot = 1, Some = 5, Few established ones = 10 | | | 0 |
| 6 | Are established vendors seeking to acquire companies or establishing partnerships to address this market | Yes =1, some =5, most of the partnering is done = 10 | | | 0 |
| 7 | Significant interest in the VC community to fund vendors building innovative solutions to serve this space | 1 = Yes, 5 = most VC funding has already happened, no VC interest =10 | | | 0 |
| 8 | How mature are the standards that govern uniform roll out of this application | Still evolving = 1, more or less settled = 5, done and stable = 10 | | | 0 |
| | | Sum of weights has to always equal 1 | 0 | | 0 |

FIG. 9.

| | Parameter | Rating Score Key | Weight | Rating | Total score |
|---|---|---|---|---|---|
| 1 | Have service providers rolled the application in test markets and receiving feedback on performance | Very few = 1, Several = 5, Every SP = 10 | | | 0 |
| 2 | Are SPs seeking to differentiate their Service level agreements | Yes = 1, No = 10 | | | 0 |
| 3 | Have SPs identified the content and applications that run on the infrastructure | Some = 1, Lot of applications available = 10 | | | 0 |
| 4 | Are service providers seeking tie up with content or software providers to better deliver the application | Yes in process = 1, a few have happened = 5, already done = 10 | | | 0 |
| 5 | Has the competition amongst the infrastructure vendors become intense and price is the key differentiator | No = 1, mostly price = 10 | | | 0 |
| 6 | Are infrastructure vendors adding only small feature increments to their solutions | Still evolving = 1, more or less settled = 5, done and stable = 10 | | | 0 |
| | | Sum of weights has to always equal 1 | 0 | | 0 |

FIG. 10.

| | Parameter | Rating Score Key | Weight | Rating | Total score |
|---|---|---|---|---|---|
| 1 | How differentiated are the offers from the service providers | Very differentiated = 1, some differentiation = 5, very little differentiation = 10 | | | 0 |
| 2 | Is the application available in 90% of the market | No = 1, Yes = 10 | | | 0 |
| 3 | Intensity of price competition among service providers | Very little = 1, a lot = 10 | | | 0 |
| 4 | Intensity of price competition among vendors | Very little = 1, a lot = 10 | | | 0 |
| 5 | Are considerable resources allocated to marketing the new service | No = 1, Definitely = 10 | | | 0 |
| 6 | Are SPs focused on acquiring new (virgin) customers or converting customers from other service providers | New customers = 1, focused on stealing customers from other service providers = 10 | | | 0 |
| 7 | Is there a choice of at least 2 service providers offering this service in 90% of the major markets | No = 1, somewhat there = 5, yes = 10 | | | 0 |
| | | Sum of weights has to always equal 1 | 0 | | 0 |

FIG. 11.

| | Parameter | Rating Score Key | Weight | Rating | Total score |
|---|---|---|---|---|---|
| 1 | Do Service providers believe that the growth rates for the service have flattened out | No = 1, Yes = 10 | | | 0 |
| 2 | Are VCs starting to fund a lot of start ups building equipment to offer a similar service or an enhanced service at a much lower cost point to the service provider | No = 1, Yes = 10 | | | 0 |
| 3 | Are established vendors having difficulty in defining what the next generation of the service will be | Very little = 1, a lot = 10 | | | 0 |
| 4 | Have new requirements emerged that are fundamentally altering the assumptions made by the SP at the time the service was launched | Very little = 1, a lot = 10 | | | 0 |
| 5 | Is the differentiation among the applications offered limited to bundling | No = 1, Definitely = 10 | | | 0 |
| | | Sum of weights has to always equal 1 | 0 | | 0 |

FIG. 12.

METHODS AND SYSTEMS FOR PORTFOLIO INVESTMENT THESIS BASED ON APPLICATION LIFE CYCLES

FIELD OF THE INVENTION

The present invention relates generally to product/service investment decision maling. More particularly, the present invention provides methods and systems for a product/service portfolio investment determination based on an application life cycle which can be used, for example, to improve product and service investment decisions for telecommunications and datacommunications products and services.

BACKGROUND OF THE INVENTION

There are many matrices that strategy consultants use to determine corporate positioning and strategy, examples include the Space Matrix, GE/McKinsey Matrix, TOWS Matrix, IE Matrix, Grand Strategy Matrix, BCG Growth Strategy Matrix, and the like. These are examples of frameworks that have already been developed to determine strategy at a corporate level. Of these, the GE/McKinsey Matrix is the most popular one and is often used by consultants to determine corporate strategy. Examples of these frameworks can be found in most management texts or in Harvard Business Review publications. The other most commonly used framework is the Product Life cycle.

In consulting engagements with General Electric (GE) in the 1970's, McKinsey & Company developed a nine-cell portfolio matrix as a tool for screening GE's large portfolio of strategic business units (SBUs). The GE matrix generalizes axes of a graph as "Industry Attractiveness" and "Business Unit Strength." Industry attractiveness and business unit strength are calculated by first identifying criteria for each, determining the value of each parameter in the criteria, and multiplying that value by a weighting factor. The result is a quantitative measure of industry attractiveness and the business unit's relative performance in that industry.

Disadvantageously, the above listed methodologies are lacking with respect to telecommunication and datacommunication products and services. For example, these methodologies are used primarily to determine corporate strategy at a macro level and are not very good at defining product/service strategies. These methodologies also do not address how investments should be allocated in a product/service portfolio and they do not take into account applications addressed by the products and services. Further, these methodologies do not address when to invest in adjacent product areas to effectively ride an application life cycle and maximize the capture of customer spending. Also, these methodologies fail to take into account market maturity for the application addressed by the product. These above listed methodologies can outline a product life cycle based on history, but they provide no indication of the location within product life cycle and what is about to happen next. Such determinations are crucial for allocating investment resources to products and services.

BRIEF SUMMARY OF THE INVENTION

In various exemplary embodiments, the present invention provides methods and systems for a product/service portfolio investment determination based on an application life cycle. The present invention defines an application life cycle, and provides a mechanism to define a location within the application life cycle to improve product and service investment decisions. In an exemplary embodiment, the present invention maps the application life cycle with respect to telecommunications and datacommunications products and services.

In an exemplary embodiment, a processor-implemented method for determining a portfolio investment based on an application life cycle includes identifying an application associated with a product or service; calculating the application life cycle associated with the application; and allocating resources to the product or service responsive to the calculated application life cycle. The application life cycle can include a plurality of phases, and wherein calculating the application life cycle includes a quantitative calculation of a location within the plurality of phases of the application. The application optionally includes a telecommunication or datacommunication application, and wherein the plurality of phases includes an infrastructure build-out phase, an application delivery phase, an offer/promotion phase, and a service evolution phase. The processor-implemented method further includes determining a plurality of parameters associated with each of the plurality of phases; and assigning a weighting to each of the plurality of parameters. Calculating the application life cycle includes assigning a rating to each of the plurality of parameters; and determining an application life cycle location responsive to a combination of the rating and the weighting for each of the plurality of parameters. The resources can include any of capital, development resources, sales, and marketing; and the application can include one of triple play, quadruple play, wireless data, wireless video, wireless voice, fixed wireless access, enterprise data, enterprise voice, video on demand, digital video recording, fiber-to-the-X, passive optical networking, residential data, voice over Internet Protocol, Internet Protocol television, social networking, and fixed-mobile convergence. In the infrastructure build-out phase, the resources are allocated to feature enhancement on the product or service; in the application development phase, the resources are allocated to application support on the product or service; in the offer/promotion phase, the resources are allocated to cost reduction of the product or service; and in the service evolution, the resources are allocated to a new product or service. The processor-implemented method can include computer readable storage media storing instructions that upon execution by a system processor cause the system processor to perform the processor-implemented method.

In another exemplary embodiment, a computer configured to determine a portfolio investment based on an application life cycle, includes a data store; memory; input/output interfaces; a network interface; and one or more processors; wherein each of the data store, memory, input/output interfaces, the network interface, and the one or more processors are configured to communicate over a local interface; and wherein the one or more processors are configured to receive an identified application associated with a product or service; calculate the application life cycle associated with the application; and determine an allocation of resources to the product or service responsive to the calculated application life cycle. The application life cycle can include a plurality of phases, and wherein calculating the application life cycle includes a quantitative calculation of a location within the plurality of phases of the application. The application optionally includes a telecommunication or datacommunication application, and wherein the plurality of phases includes an infrastructure build-out phase, an application delivery phase, an offer/promotion phase, and a service evolution phase. The one or more processor can be further configured to: receive a plurality of parameters associated with each of the plurality of phases; and receive an assignment of a weighting to each of the plurality of parameters. To calculate the application life cycle includes assigning a rating to each of the plurality of parameters; and determining an application life cycle location responsive to a combination of the rating and the weighting for each of the plurality of parameters. The resources can include any of capital, development resources, sales, and marketing; and the application can include one of triple play, quadruple play, wireless data, wireless video, wireless voice, fixed wireless access, enterprise data, enterprise voice, video on demand, digital video recording, fiber-to-the-X, passive optical networking, residential data, voice over Internet Protocol, Internet Protocol television, social networking, and fixed-mobile convergence. In the infrastructure build-out phase, the resources are allocated to feature enhancement on the product or service; in the application development phase, the resources are allocated to application support on the product or service; in the offer/promotion phase, the resources are allocated to cost reduction of the product or service; and in the service evolution, the resources are allocated to a new product or service.

In yet another exemplary embodiment, a method for determining a portfolio investment based on an application life cycle, wherein the method is implemented on a computer, the method includes identifying an application associated with a product or service; determining a plurality of parameters associated with each of a plurality of phases associated with the application life cycle; assigning a weighting to each of the plurality of parameters; assigning a rating to each of the plurality of parameters; determining an application life cycle location responsive to a combination of the rating and the weighting for each of the plurality of parameters; and allocating resources to the product or service responsive to the calculated application life cycle. The application comprises a telecommunication or datacommunication application, and wherein the plurality of phases comprise an infrastructure build-out phase, an application delivery phase, an offer/promotion phase, and a service evolution phase. In the infrastructure build-out phase, the resources are allocated to feature enhancement on the product or service; in the application development phase, the resources are allocated to application support on the product or service; in the offer/promotion phase, the resources are allocated to cost reduction of the product or service; and in the service evolution, the resources are allocated to a new product or service. The method can include computer readable storage media storing instructions that upon execution by a system processor cause the system processor to perform the method.

BRIEF DESCRIPTION OF THE DRAWINGS

The present invention is illustrated and described herein with reference to the various drawings, in which like reference numbers denote like method steps and/or system components, respectively, and in which:

FIG. 9 is a matrix for an infrastructure build-out calculation for use with the application life cycle calculation in FIG. 8 according to an exemplary embodiment of the present invention;

FIG. 10 is a matrix for an application delivery calculation for use with the application life cycle calculation in FIG. 8 according to an exemplary embodiment of the present invention;

FIG. 11 is a matrix for an offer/promotion calculation for use with the application life cycle calculation in FIG. 8 according to an exemplary embodiment of the present invention;

FIG. 12 is a matrix for an service delivery calculation for use with the application life cycle calculation in FIG. 8 according to an exemplary embodiment of the present invention.

DETAILED DESCRIPTION OF THE INVENTION

In various exemplary embodiments, the present invention provides methods and systems for a product/service portfolio investment determination based on an application life cycle. The present invention defines the application life cycle, and provides a mechanism to define a location within the application life cycle to improve product and service investment decisions. In an exemplary embodiment, the present invention maps the application life cycle with respect to telecommunications and datacommunications products and services, such as, for example, triple play (bundled services of voice, video, and data), wireless data, wireless video, wireless voice, fixed wireless access (e.g. WIMAX), enterprise data, residential data, voice over Internet Protocol (VoIP), IP television (IPTV), and the like.

Generally, the present invention provides a mechanism to map out an application life cycle. This mechanism provides a linkage between the application life cycle and a product life cycle to determine investment priorities and product/service strategy. Advantageously, the present invention can help determine which products or services to fund, if the market conditions are ripe for a product or service to take off within the context of the solution, which other areas (adjacent areas) to invest in, when it is time to focus on cost reduction and harvesting of a product/service platform, and when the conditions are ripe for investing in the next generation of products and services to replace the current generation. Additionally, the present invention can assist in anticipating corporate strategies of competitors.

Figure 1:
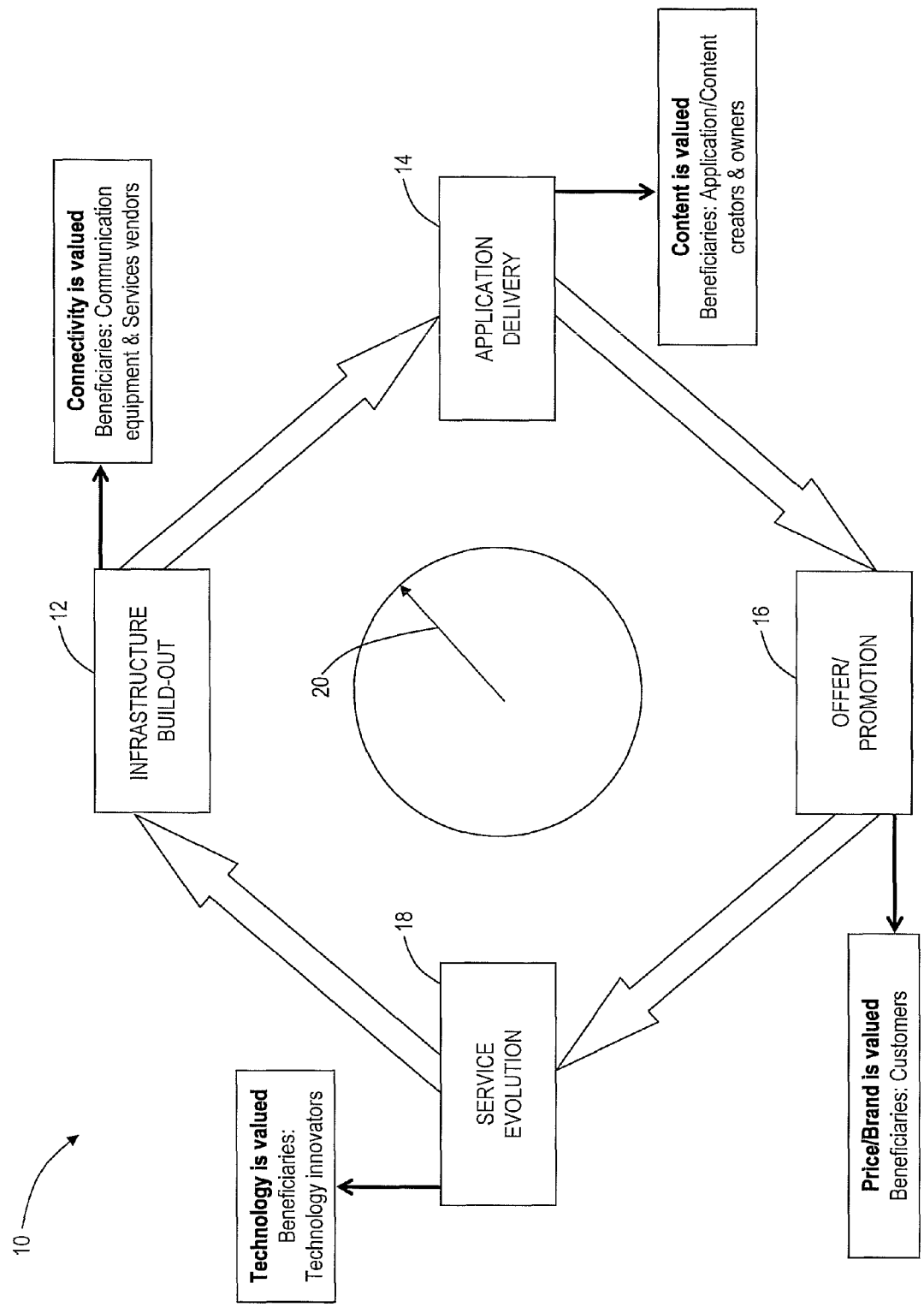
FIG. 1 is a diagram of a telecommunication/datacommunication service provider application life cycle according to an exemplary embodiment of the present invention.

Referring to FIG. 1, a telecommunication/datacommunication service provider application life cycle 10 is illustrated according to an exemplary embodiment of the present invention. The application life cycle 10 is conceptualize as a circle with four points each located 90° apart to signify a particular state of a product/service. Note, the particular state can fall anywhere within the circle. Telecom and datacom service providers (SPs) can go through the application life cycle 10 to determine the lifecycle of the products and services that are used to support an application associated with the application life cycle 10. These products can be software, hardware, or services. Generally speaking, there are at least four distinct stages in the application life cycle 10 including an infrastructure build out 12, application delivery 14, offer/promotion 16, and service evolution 18.

During the infrastructure build out 12 stage, connectivity is valued, and the beneficiaries are communications equipment vendors and vendors of services. In the application delivery 14 stage, content is valued, and the beneficiaries are those that enable content delivery, i.e. both hardware and software providers. During the offer/promotion 16 stage, price/brand is valued with customers benefiting. Customers see price competition and advertising agencies capture a lot of the spending during this stage. In the service evolution 18 stage, the application evolves and technology innovators benefit during this stage.

The present invention includes a mechanism to map applications into the application life cycle 10 to determine a location 20 along the application life cycle 10. Further, the mapping of the location 20 is not just to each stage 12, 14, 16, 18, but rather can be between stages 12, 14, 16, 18, capturing more details regarding the application life cycle 10. Advantageously, the location 20 allows investment decisions to be performed on products and services associated with the application. Each stage 12, 14, 16, 18 has different implications with respect to investment allocation as are discussed herein.

Referring to FIGS. 2 through 5, various exemplary application life cycles 10a-10d are illustrated for applications, such as wireline voice, residential data, newer services, and vendor messaging, according to an exemplary embodiment of the present invention. These exemplary application life cycles 10a-10d provide validation of the application life cycle 10 for past telecom/datacom applications.

Figure 2:
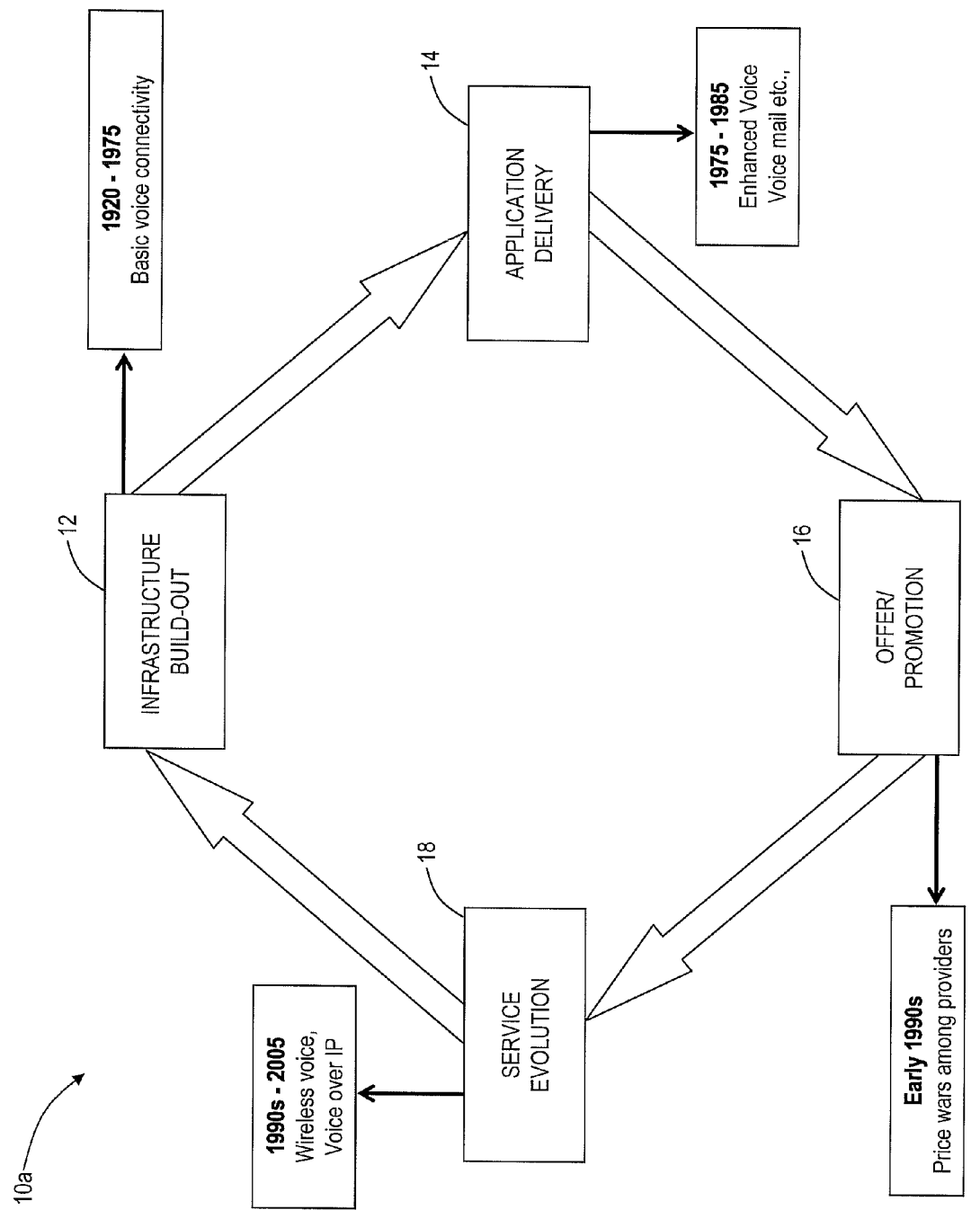
FIG. 2 is a diagram of the application life cycle in FIG. 1 applied to wireline phone, i.e. traditional plain old telephone service (POTS), according to an exemplary embodiment of the present invention.

FIG. 2 illustrates the application life cycle 10a for wireline phone, i.e. traditional plain old telephone service (POTS). For example, from approximately 1920 to 1975, basic voice connectivity was valued (i.e., in the infrastructure build-out 12 phase), then from approximately 1975 to 1985, enhanced features such as voice mail, call forwarding, etc. were valued (i.e., in the application delivery 14 phase). In the early 1990s, there was little or no differentiation between the voice services offered by service providers (SPs) which led to price wars among providers with the emergence of competitive local exchange carriers (CLECs) and the like (i.e., in the offer/promotion 16 phase). From the mid-to-late 1990s, the basic wireline voice service had evolved into wireless voice and Voice over Internet Protocol (VoIP) services (i.e., in the service evolution 18 phase, POTS moving towards wireless voice and VoIP as replacements). Accordingly, wireline voice service is shown to have historical tracked to the application life cycle 10a. Note, wireline voice service (POTS) is now viewed as a complete commodity service with little to no new investment in service offering provided.

Figure 3:
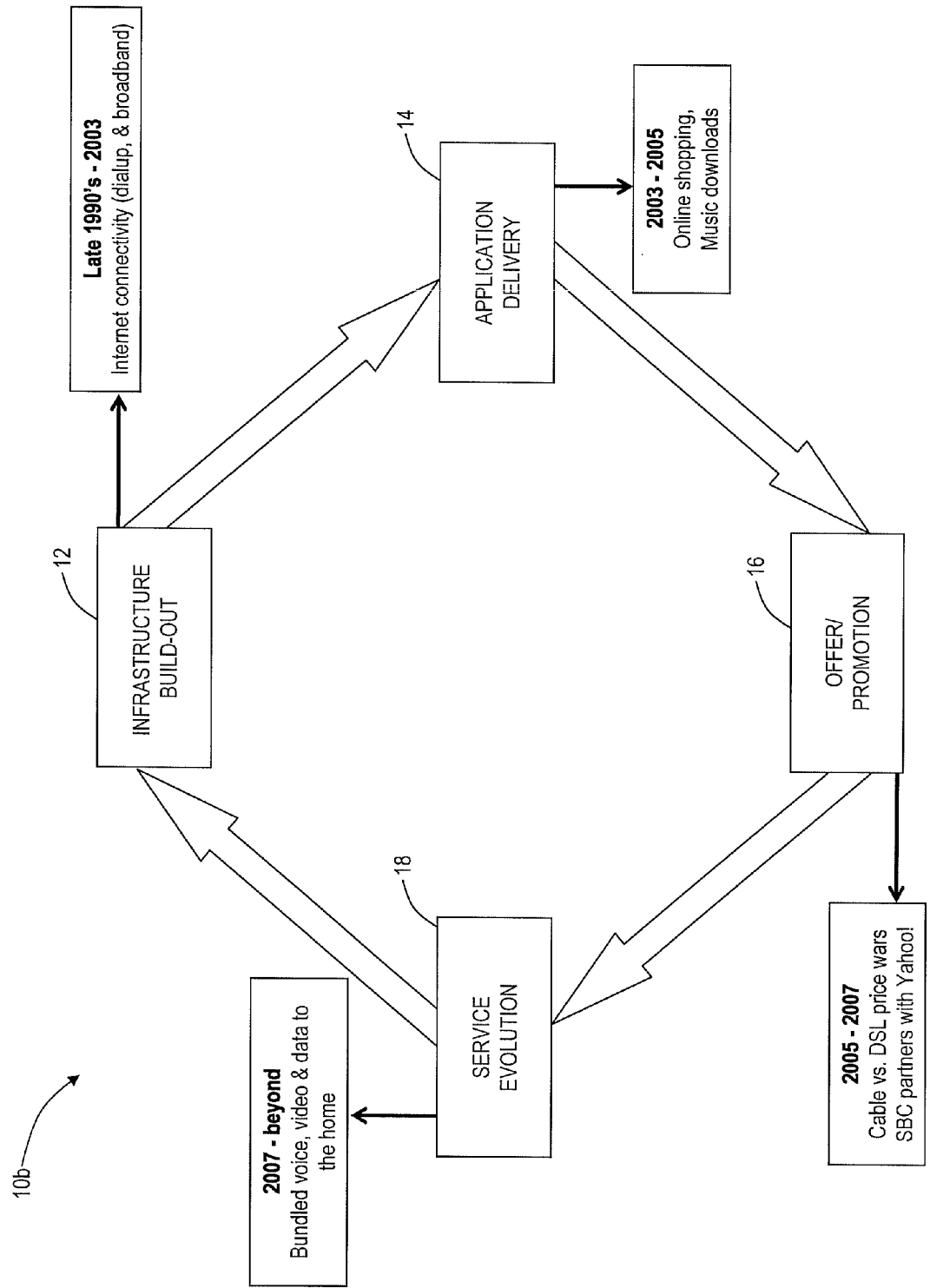
FIG. 3 is a diagram of the application life cycle in FIG. 1 applied to residential data, i.e. Internet access such as cable modem, digital subscriber loop (DSL), and the like, according to an exemplary embodiment of the present invention.

FIG. 3 illustrates the application life cycle 10b for residential data, i.e. Internet access such as cable modem, digital subscriber loop (DSL), and the like. Residential data can be shown to have followed a similar patter as wireline voice. In the late 1990s to 2003, basic connectivity to the Internet was valued (i.e., in the infrastructure build-out 12 phase), during 2003-2005 applications delivery was valued, value shifted from connectivity to services enabled by connectivity such as music downloads and online shopping (i.e., in the application delivery 14 phase). In the infrastructure build-out 12 phase, the investments were in developing the Internet infrastructure and last-mile access mechanism, and then in the application delivery 14 phase, the investments shifted away from infrastructure and access towards content developers. From 2005 to 2007, there was enormous pressure within the service provider community to grab customer foot print that led to branding partnerships (e.g., Yahoo! teamed up with SBC to offer Internet) and the Cable/DSL price wars (i.e., in the offer/promotion 16 phase). Now the services are evolving, into service bundling, triple play (i.e., data, voice, video), quadruple play, etc. (i.e., in the service evolution 18 phase). The application life cycle 10b illustrates a more recent example of the validity of the application life cycle 10. Here, residential data is at the end of its life cycle with a view towards the next evolution of the service.

Figure 4:
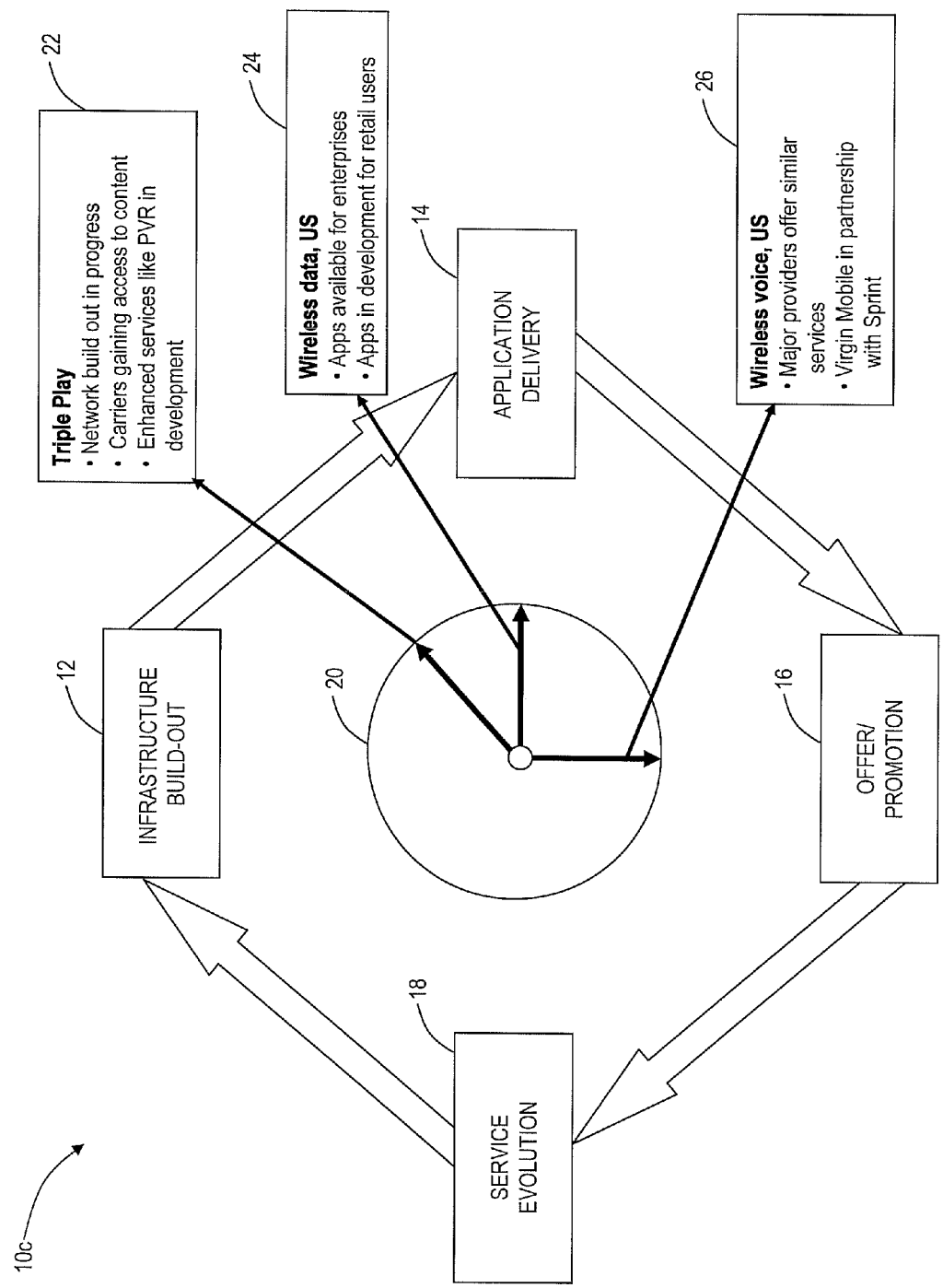
FIG. 4 is a diagram of the application life cycle in FIG. 1 applied to various newer services, such as triple play, wireless data, and wireless voice, according to an exemplary embodiment of the present invention.

FIG. 4 illustrates the application life cycle 10c for various newer services, such as triple play 22, wireless data 24, and wireless voice 26. Applications can fall at any location 20 in the application life cycle 10c, providing guidance to investment decisions for the application. The application life cycle 10c maps some of the newer services, such as triple play, where SPs are still in the network infrastructure build-out 12 phase, e.g. carriers are gaining access to the content and enhanced services like Personal Video Recorder (PVR) are in development. Wireless data 24 is another example where SPs are still in the development of applications, i.e. between the infrastructure build-out 12 phase and the application delivery 14 phase, especially for enterprises (e.g., banking via mobile phone) and retail users (e.g., video downloads to cellphone, laptop wireless cards, etc.). Another example is wireless voice 26 where SPs have passed the basic connectivity phase (i.e. the infrastructure build-out 12 phase) and the delivery of voice phase (i.e., application delivery 14 phase). Now, wireless voice is in a price/brand war phase (i.e., offer/promotion 16 phase) with various SPs utilizing price and partnerships to gain market share.

Figure 5:
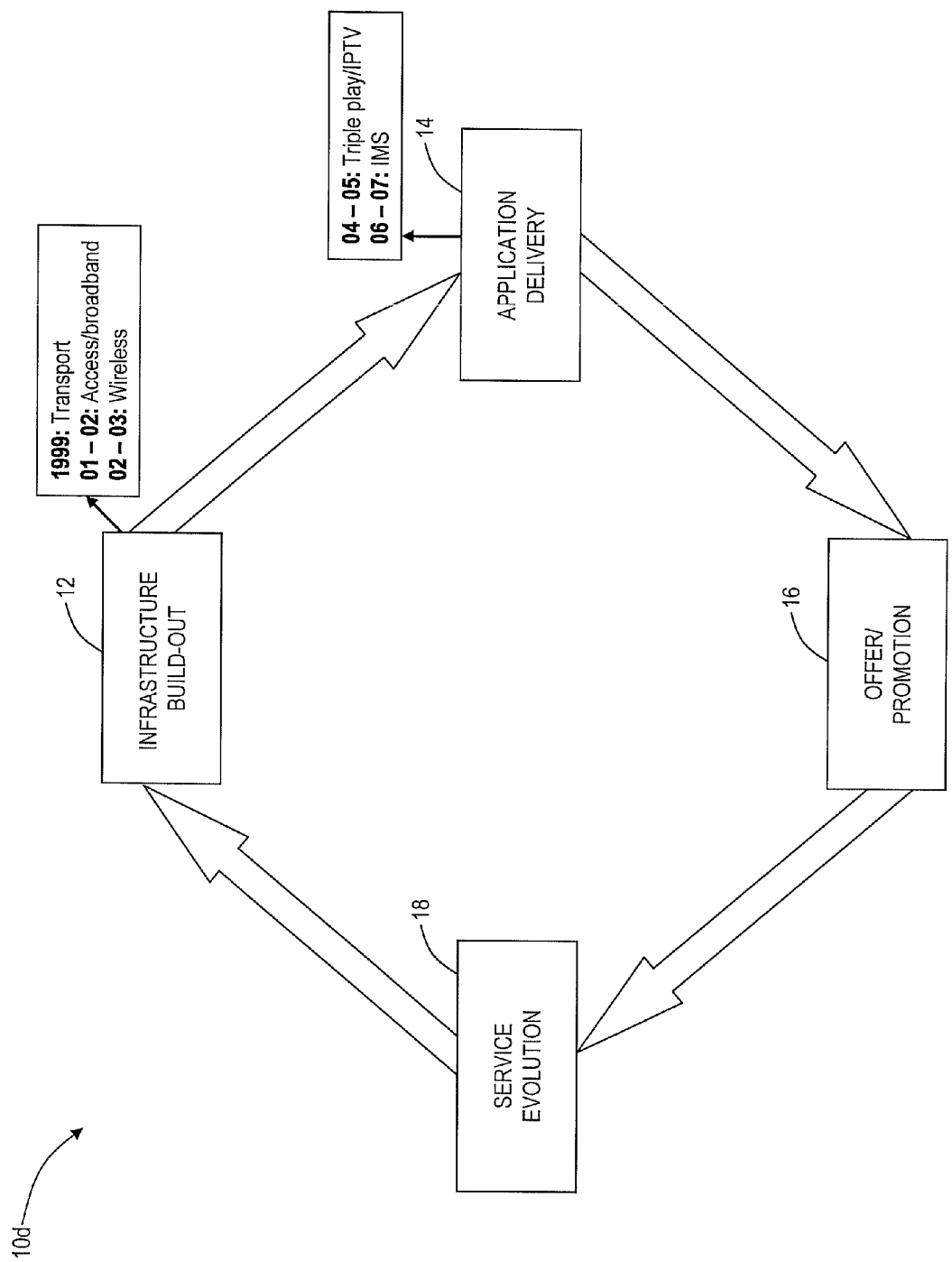
FIG. 5 is a diagram of the application life cycle in FIG. 1 showing evidence on how equipment vendors are evolving their messaging to the market according to an exemplary embodiment of the present invention.

FIG. 5 illustrates the application life cycle 10d showing evidence on how equipment vendors are evolving their messaging to the market, i.e. through their sales and marketing pitches. The application life cycles 10a-10c illustrate a mapping of applications, and the application life cycle 10d illustrates evidence for shifting messaging from equipment vendors in response to the applications. During approximately 1999 to 2003, basic transport was the key message, be it transport in the long haul through optical networks, or connectivity in the access part of the network (e.g., DSL, cable modems, fiber-to-the-X, etc.) or connectivity through wireless (i.e., in the infrastructure build-out 12 phase). During approximately the 2004 to 2006 timeframe, equipment vendor's focus changed from basic connectivity to application delivery, such as triple play, IPTV, IP Multimedia Subsystem (IMS), and the like (i.e., in the application delivery 14 phase).

Accordingly, FIGS. 2 through 5 provide validation that SP applications follow the application life cycle 10, and that equipment vendors supporting these applications unconsciously follow this cycle 10 as well through their sales and marketing strategies. As such, it is advantageous to provide a mechanism to map an application into the application life cycle 10. The mechanism provides a method to map the application location 20 based on one or more predetermined criteria.

Figure 6:
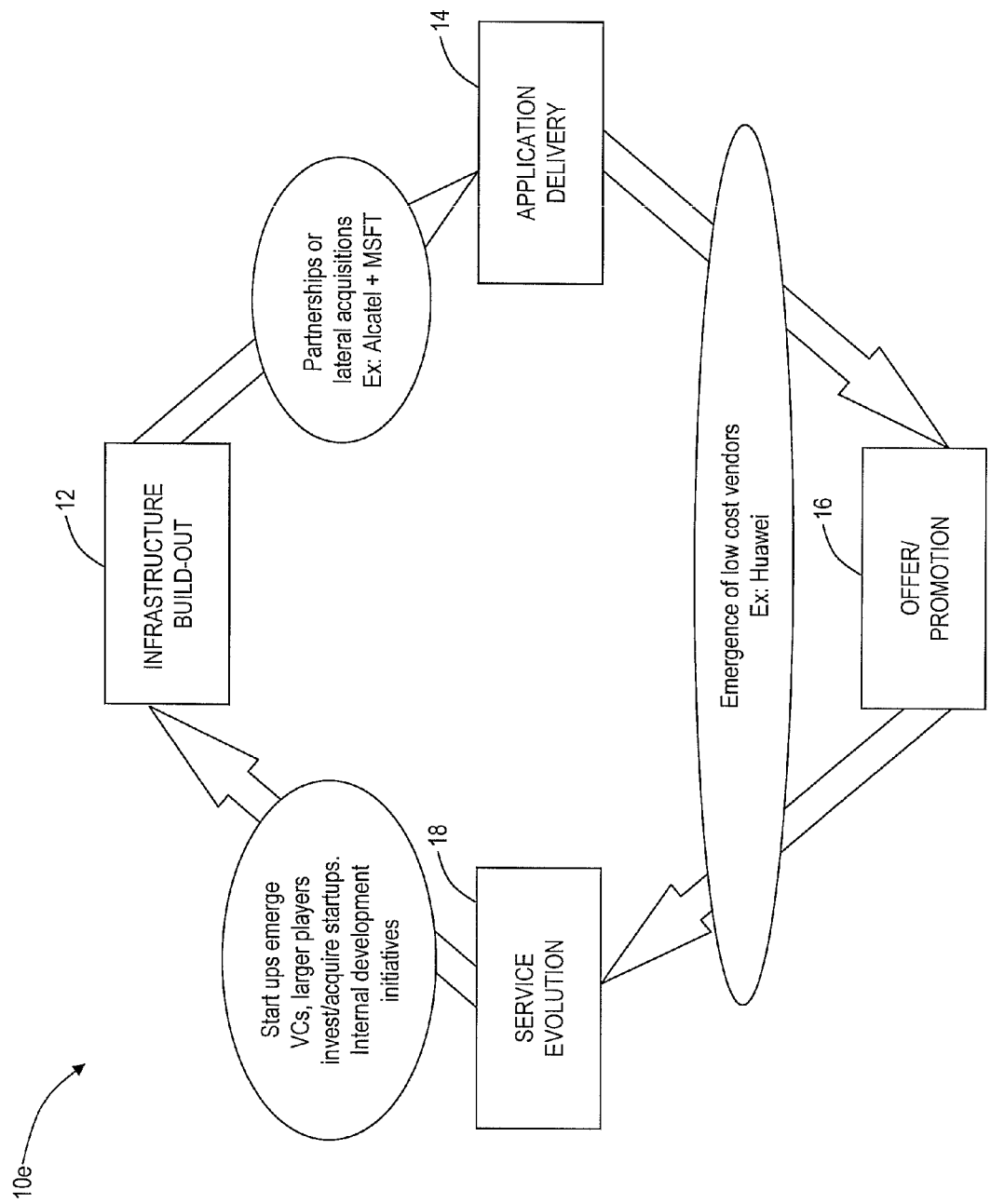
FIG. 6 is a diagram of the application life cycle in FIG. 1 mapping competitor's investment strategies according to an exemplary embodiment of the present invention.

Referring to FIG. 6, an application life cycle 10e is illustrated mapping competitor's investment strategies according to an exemplary embodiment of the present invention. The application life cycle 10e provides a guideline of what to expect from other vendors for providing products and services to achieve a specific application associated with the application life cycle 10e. In between the infrastructure build-out 12 phase and the application delivery 14 phase, vendors and SPs can expect to see partnerships and lateral acquisitions, such as Alcatel and Microsoft partnering in the delivery of IPTV. In the lower half of the application life cycle 10e, i.e. between application delivery 14 and offer/promotion 16 and between offer/promotion 16 and service evolution 18, price is the important application driver. Accordingly, low-cost vendors emerge and product/service margins suffer in the marketplace. In the service evolution 18 phase, the application sees the emergence of startup companies, investment/acquisitions by larger vendors, and internal development initiatives for next generation products. Accordingly, mapping specific applications onto the application life cycle 10e provides a good guide as to what corporate movements to expect from competitors.

Figure 7:
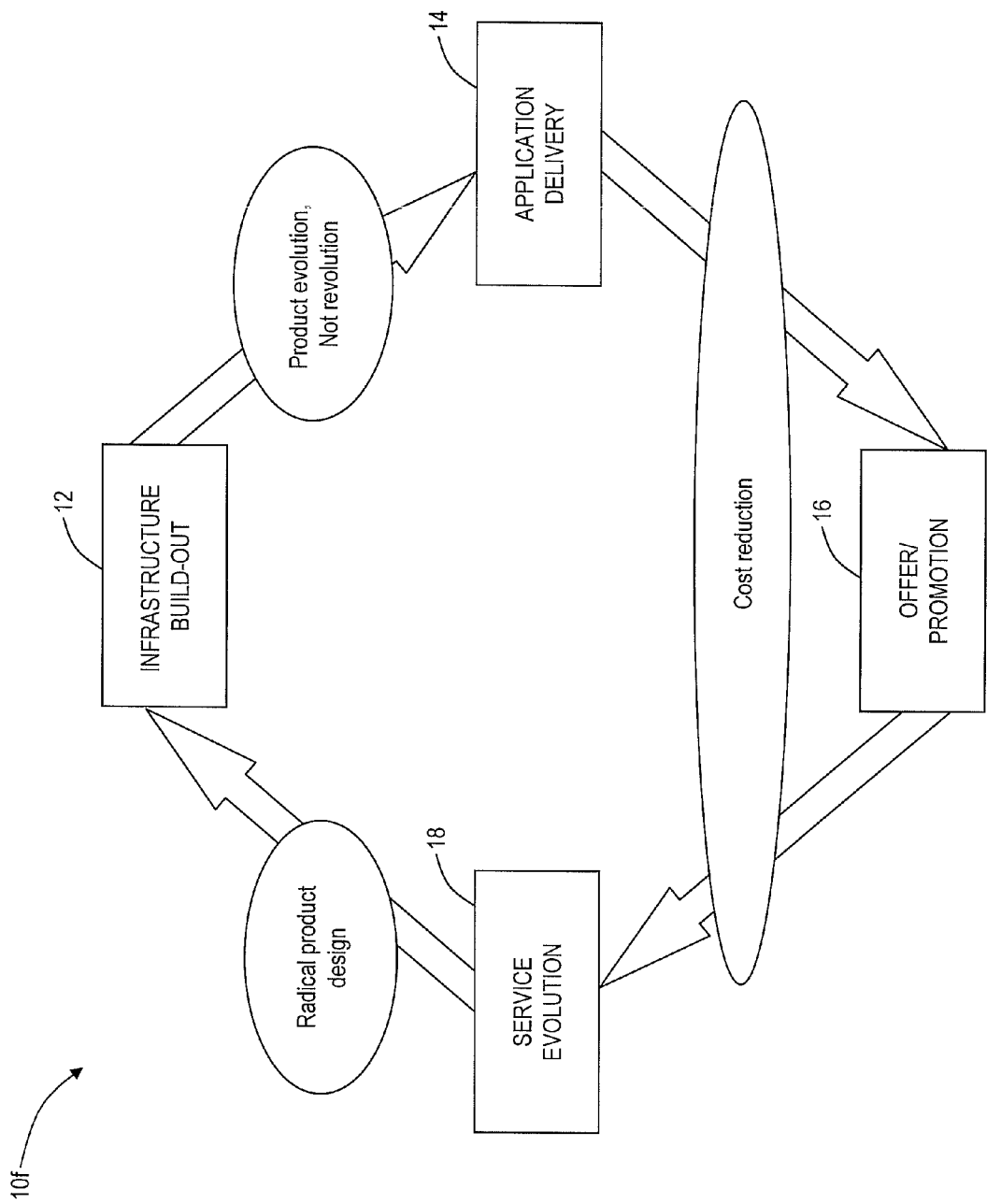
FIG. 7 is a diagram of the application life cycle in FIG. 1 outlining guidelines for managing a company's investment strategies based on the application life cycle according to an exemplary embodiment of the present invention.

Referring to FIG. 7, an application life cycle 10f is illustrated outlining guidelines for managing a company's investment strategies based on the application life cycle 10f according to an exemplary embodiment of the present invention. In between the infrastructure build-out 12 phase and the application delivery 14 phase, the company should focus on product evolution, not revolution for products and services to provide the specified application. Here, the focus should be on incremental features on products and services to provide enhanced applications, i.e. to move the application into the application delivery 14 phase. In the lower half of the application life cycle 10f, i.e. between application delivery 14 and offer/promotion 16 and between offer/promotion 16 and service evolution 18, price is the important application driver and accordingly companies should focus investment in research and development (R&D) on cost reduction rather than feature enhancement. In the service evolution 18 phase, companies should focus on radical new product and service design. Here, the focus should be not on feature evolution or cost reduction, but on entirely new product or service designs.

Figure 8:
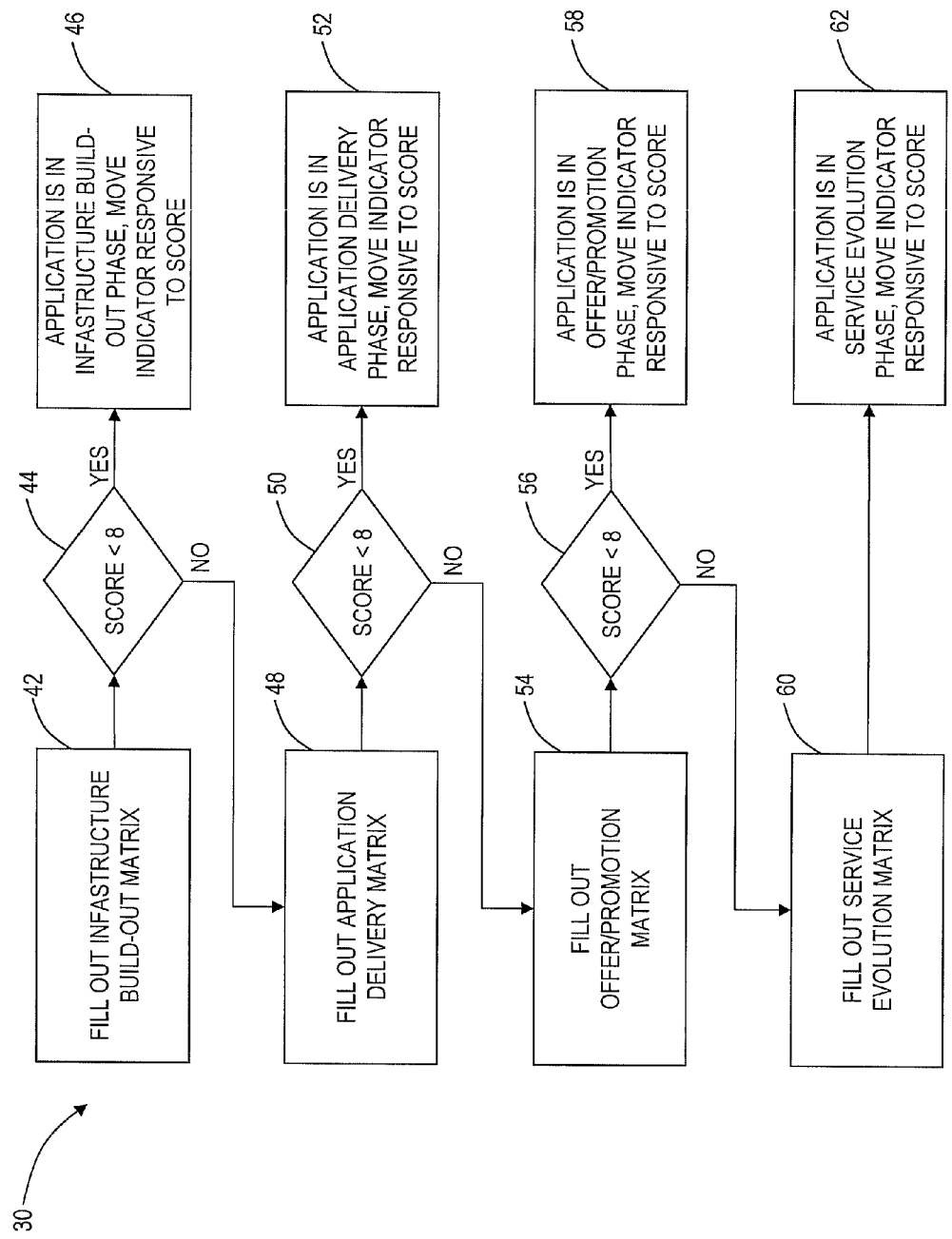
FIG. 8 is a flowchart of an exemplary application life cycle calculation for mapping applications into the application life cycle according to an exemplary embodiment of the present invention.

Referring to FIGS. 8 through 12, a flowchart and matrices are illustrated to provide an exemplary application life cycle calculation 30 for mapping applications into the application life cycle 10 according to an exemplary embodiment of the present invention. FIG. 8 illustrates a flowchart for performing the application life cycle calculation 30, and FIGS. 9 through 12 include matrices 32, 34, 36, 38 for calculations associated with the application life cycle calculation 30. Collectively, the application life cycle calculation 30 with the matrices 32, 34, 36, 38 provides a mechanism to determine the location 20 of an application within the application life cycle 10.

Additionally, the matrices 32, 34, 36, 38 include weights providing a mechanism to weigh various criteria associated with each phase in the application life cycle 10. Each of the matrices 32, 34, 36, 38 includes a list of parameters which are assigned a weight such that the sum of weights of all the parameters equals one. Each parameter includes a rating score key, such as one to ten. Those of ordinary skill in the art will recognize other weighing and rating mechanisms could also be utilized. A user can alter the weights according to a value of each parameter. Then the user can include the rating for each parameter based on qualitative and quantitative factors associated with each parameter.

The application life cycle calculation 30 begins by filling out an infrastructure build-out matrix 32 (step 42). The infrastructure build-out matrix 32 is illustrated in FIG. 9 and includes eight exemplary parameters. Note, the infrastructure build-out matrix 32 could include additional parameters. A first parameter looks at a number of SPs offering a particular application/service (i.e., the application for which the application life cycle calculation 30 is performed). Also, the first parameter can be isolated to a specific geography. The rating for the first parameter is one for very few up to ten for every SP. Accordingly, the higher value here for SPs offering the application/service, the more likely the application is out of the build-out phase.

The second parameter looks at the number of articles and messaging from vendors on the network architecture required to roll out the application/service with one representing very few to ten representing every SP. The third parameters looks at the effort being spent by SPs to define the application and how to charge for it with one representing a lot of effort to ten representing that this is already defined. The fourth parameter looks at the average of industry analyst's projected growth rates for the equipment needed to support the application's infrastructure with one representing a high growth rate to ten representing a declining growth rate. The fifth parameter looks at the number of vendors, new and established vying to build the application's infrastructure with one representing a lot to ten representing a few.

The sixth parameter asks if established vendors are seeking to acquire companies or establishing partnerships to address the application's market with one representing yes to most and ten representing that most of this is done. The seventh vendors building innovative solutions to serve this application's space with one representing significant interest to ten representing no VC interest. The eighth parameter asks how mature standards activities are that govern uniform roll out of this application with one representing still evolving to ten representing that standards activities are done and stable.

As described herein, each of these parameters can be weighted as a percentage from 0% to 100% such that the sum equals 100%. This enables a user to give a higher or lower weighting to a particular parameter as deemed necessary. The lower the score on each parameter, the more likely the application is still in the infrastructure build-out 12 phase. Referring back to FIG. 8, once the score is computed from the infrastructure build-out matrix 32 (step 42), the score is checked in step 44. Here, a score lower than eight signifies the application is in the infrastructure build-out 12 phase (step 46), and the location 20 of the application within this phase is determined responsive to the score. The location can be moved within the space between the infrastructure build-out 12 phase and the application delivery 14 phase responsive to the score value. For example, a low score, e.g. 0 could equate to a position of the location 20 of 12 o'clock, a higher score of 4 could equate to a position of the location 20 of 1:30, etc.

If the score is greater than eight (step 42), the application life cycle calculation 30 moves to filling out an application delivery matrix 34 (step 48). The application delivery matrix 34 is illustrated in FIG. 10 and includes six exemplary parameters. Note, the application delivery matrix 34 could include additional parameters. Similarly to the infrastructure build-out matrix 32, the application delivery matrix 34 includes the same structure of weightings and ratings. A first parameter asks if SPs have rolled the application in test markets and received feedback on performance with one representing very few to ten representing every SP.

The second parameter looks if SPs are differentiating their service level agreements (SLAs) with one representing yes to ten representing no. The third parameter looks if SPs have identified the content and applications that run on the infrastructure with one represent some content and applications to ten representing lots of content and applications. The fourth parameter checks if SPs are seeking to tie up with content or software providers to better deliver the application with one representing SPs are in progress of doing it to ten representing its already done.

The fifth parameter asks if the competition amongst the infrastructure vendors has become intense with price as the key differentiator with one representing no to ten representing yes that most price is the differentiator. The sixth parameter looks if infrastructure vendors are adding only small feature increments to their application solutions with one representing still evolving to ten representing that vendors are done and stable on feature increments.

As described herein, each of these parameters can be weighted as a percentage from 0% to 100% such that the sum equals 100%. This enables a user to give a higher or lower weighting to a particular parameter as deemed necessary. The lower the score on each parameter, the more likely the application is still in the application delivery 14 phase. Referring back to FIG. 8, once the score is computed from the application delivery matrix 34 (step 48), the score is checked in step 50. Here, a score lower than eight signifies the application is in the application delivery 14 phase (step 52), and the location 20 of the application within this phase is determined responsive to the score. The location can be moved within the space between the application delivery 14 phase and the offer/promotion 16 phase responsive to the score value. For example, a low score, e.g. 0 could equate to a position of the location 20 of 3 o'clock, a higher score of 4 could equate to a position of the location 20 of 4:30, etc.

If the score is greater than eight (step 50), the application life cycle calculation 30 moves to filling out an offer/promotion matrix 36 (step 54). The offer/promotion matrix 36 is illustrated in FIG. 11 and includes seven exemplary parameters. Note, the offer/promotion matrix 36 could include additional parameters. Similarly to the infrastructure build-out matrix 32, the offer/promotion matrix 36 includes the same structure of weightings and ratings. The first parameter asks how differentiated are the offers from SPs with one representing a lot of differentiation to ten representing very little differentiation.

The second parameter asks if the application is available in at least 90% of the markets with one representing no to ten representing yes. The third parameter looks to the intensity of price competition among SPs with one representing very little to ten representing a lot. The fourth parameter looks to the intensity of price competition among vendors with one representing very little to ten representing a lot. The fifth parameter asks if considerable resources are allocated to marketing new services with one representing no to ten representing definitely yes.

The sixth parameter looks if SPs are focused on acquiring new (virgin) customers or converting customer from other SPs with one representing a focus on new customers to ten representing a focus on stealing customers from other SPs. The seventh parameter asks if there is a choice of at least two SPs offering this service or application in 90% of the major markets with one representing no to ten representing yes.

As described herein, each of these parameters can be weighted as a percentage from 0% to 100% such that the sum equals 100%. This enables a user to give a higher or lower weighting to a particular parameter as deemed necessary. The lower the score on each parameter, the more likely the application is still in the offer/promotion 16 phase. Referring back to FIG. 8, once the score is computed from the offer/promotion matrix 36 (step 54), the score is checked in step 56. Here, a score lower than eight signifies the application is in the offer/promotion 16 phase (step 58) and the location 20 of the application within this phase is determined responsive to the score. The location can be moved within the space between the offer/promotion 16 phase and the service delivery 18 phase responsive to the score value. For example, a low score, e.g. 0 could equate to a position of the location 20 of 6 o'clock, a higher score of 4 could equate to a position of the location 20 of 7:30, etc.

If the score is greater than eight (step 56), the application life cycle calculation 30 moves to filing out a service evolution matrix 38 (step 60). The service evolution matrix 38 is illustrated in FIG. 12 and includes five exemplary parameters. Note, the service evolution matrix 38 could include additional parameters. Similarly to the infrastructure build-out matrix 32, the service evolution matrix 38 includes the same structure of weightings and ratings. The first parameter looks if SPs do believe that the growth rate for the service or application has flattened out with one representing no to ten representing yes.

The second parameter looks if VCs are starting to fund a lot of start ups building equipment to offer a similar service or an enhanced service at a much lower cost point to the SP with one representing no to ten representing yes. The third parameter looks if established vendors are having difficulty in determining what the next generation of the service or application will be with one representing very little to ten representing a lot. The fourth parameter asks if new requirements have emerged that are fundamentally altering the assumptions made by the SP at the time the service was launched with one representing a very little to ten representing a lot. The fifth parameter looks if the differentiation among the applications offered is limited to bundling with one representing no to ten representing definitely yes.

As described herein, each of these parameters can be weighted as a percentage from 0% to 100% such that the sum equals 100%. This enables a user to give a higher or lower weighting to a particular parameter as deemed necessary. The lower the score on each parameter, the more likely the application is still in the service evolution 18 phase. Referring back to FIG. 8, once the score is computed from the service evolution matrix 38 (step 60), the score is utilized to determine the location 20 in the service evolution 18 phase. Here, a score lower than eight signifies the application is in the service evolution 18 phase and the location 20 of the application within this phase is determined responsive to the score. The location can be moved within the space between the service delivery 18 phase and the infrastructure build-out 12 phase responsive to the score value. For example, a low score, e.g. 0 could equate to a position of the location 20 of 9 o'clock, a higher score of 4 could equate to a position of the location 20 of 10:30, etc. For a score of eight or more, the application can be considered to have traversed the entire application life cycle 10.

Figure 13:
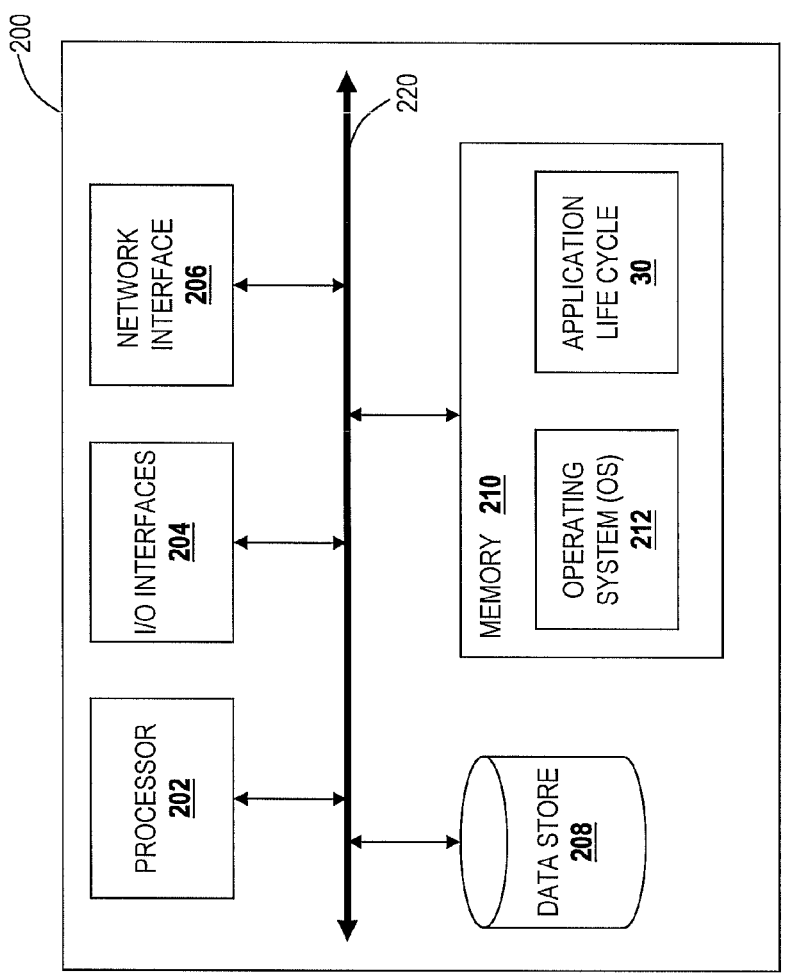
FIG. 13 is a block diagram of a computer configured to implement the application life cycle calculation of FIG. 8 according to an exemplary embodiment of the present invention.

Referring to FIG. 13, a block diagram illustrates a computer 200 configured to operate the application life cycle calculation 30 according to an exemplary embodiment of the present invention. The computer 200 can be a digital computer that, in terms of hardware architecture, generally includes a processor 202, input/output (I/O) interfaces 204, network interfaces 206, memory 210, and a data store 208.

The components (202, 204, 206, 208, and 210) are communicatively coupled via a local interface 220. The local interface 220 can be, for example but not limited to, one or more buses or other wired or wireless connections, as is known in the art. The local interface 220 can have additional elements, which are omitted for simplicity, such as controllers, buffers (caches), drivers, repeaters, and receivers, among many others, to enable communications. Further, the local interface 220 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the computer 200, a semiconductor-based microprocessor (in the form of a microchip or chip set), or generally any device for executing software instructions. When the computer 200 is in operation, the processor 202 is configured to execute software stored within the memory 210, to communicate data to and from the memory 210, and to generally control operations of the server computer pursuant to the software instructions.

The I/O interfaces 204 can be used to receive user input from and/or for providing system output to one or more devices or components. User input can be provided via, for example, a keyboard and/or a mouse. System output can be provided example, a serial port, a parallel port, a small computer system interface (SCSI), an infrared (IR) interface, a radio frequency (RF) interface, and/or a universal serial bus (USB) interface.

The network interfaces 208 can be used to enable the computer 200 to communicate on a network. The network interfaces 206 can include, for example, an Ethernet card (e.g., 10BaseT, Fast Ethernet, Gigabit Ethernet) or a wireless local area network (WLAN) card (e.g., 802.11a/b/g). The network interfaces 206 can include address, control, and/or data connections to enable appropriate communications on the network.

A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the computer 200 such as, for example, an internal hard drive connected to the local interface 220 in the computer 200. Additionally in another embodiment, the data store can be located external to the computer 200 such as, for example, an external hard drive connected to the I/O interfaces 204 (e.g., SCSI or USB connection). Finally in a third embodiment, the data store may be connected to the computer 200 through a network, such as, for example, a network attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 can have a distributed architecture, where various components are situated remotely from one another, but can be accessed by the processor 202.

The software in memory 210 can include one or more software programs, each of which includes an ordered listing of executable instructions for implementing logical functions. In the example FIG. 13, the software in the memory system 210 includes the application life cycle calculation 30 and a suitable operating system (O/S) 212. The operating system 212 essentially controls the execution of other computer programs, such as the application life cycle calculation 30, and provides scheduling, input-output control, file and data management, memory management, and communication control and related services. The operating system 212 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

In an exemplary embodiment of the present invention, the computer 200 is configured to perform the application life cycle calculation 30 depicted in FIG. 8. Specifically, the application life cycle calculation 30 can include a graphical user interface (GUI) or the like allowing a user to input the weights and ratings associated with each parameter in each of the matrices 32, 34, 36, 38. Responsive to the user input, the computer 200 can perform the application life cycle calculation 30 through the aforementioned components associated with the computer 200.

Further, the computer 200 can be configured to store results of the application life cycle calculation 30 over time in the data store 208 to provide historical reporting for each application. This can be used to monitor changes in applications over time. The present invention contemplates a graphical display of the application life cycle 10, such as through a circle as illustrated herein or through other graphical display mechanisms.

An exemplary objective of the application life cycle calculation 30 is to provide a portfolio investment determination. An application can be identified, such as an existing application, a new application, etc. A company may or may not currently have a product or service to support the application. The application life cycle calculation 30 is intended to provide guidance on how to invest capital, resources, etc. with respect to the application. For example, different investment decisions are made based on the result of the application life cycle calculation 30. Accordingly, the company can determine its investment direction responsive to results of the application life cycle calculation 30. For example, a determination that the application life cycle 10 is in the infrastructure build-out 12 phase could lead to a decision to add features and enhancements on existing products even through such features and enhancements may lead to a higher cost since new, emerging applications may drive spending. Alternatively, once the application life cycle 10 is in the bottom section between application delivery 14, offer/promotion 16, and service evolution 18, the investment focus may turn away from features and enhancements to cost reduction. Finally, as the application enters the service evolution 18 phase, investment decisions may turn to the next radically new product design to meet the application as well as additional applications, i.e. a shift in investing in existing products towards new products. It is contemplated that the company allocates resources, development resources, capital, sales, marketing, etc. to an application responsive to an outcome of the application life cycle calculation 30. Additionally, the computer 200 can be configured to provide a sample allocation of resources responsive to predetermined criteria based on the particular location 20 within the application life cycle 10. This can be based on historical comparisons based on previous investment trends, such as in past applications (e.g. the application life cycles described in FIGS. 2-5).

As described herein, the application can include any existing or new application. For example, the application can include any telecommunication, datacommunication, Internet, and the like products and services. The present invention can be utilized by equipment vendors, service providers, software developers, and the like to provide rationale to product and service investment decisions. Exemplary applications can include, for example, triple play (bundled services of voice, video, and data), quadruple play, wireless data, wireless video, wireless voice, fixed wireless access (e.g. WIMAX), enterprise data, enterprise voice, video on demand (VoD), digital video recording (DVR), fiber-to-the-X, passive optical networking (PON), residential data, voice over Internet Protocol (VoIP), IP television (IPTV), social networking, fixed-mobile convergence (FMC), and the like.

Various functions as exhibited in various embodiments according to the present invention are described above with respect to application life cycle calculations. In some embodiments, one or more processors within architectures of the environments as described above may execute the steps in such methods and provide such functionality. The functionality may spread across multiple processing elements. In other embodiments, any suitable computer readable storage device, media or combination of devices and/or media, including primary storage such as RAM, ROM, cache memory, etc. or secondary storage such as magnetic media including fixed and removable disks and tapes; optical media including fixed and removable disks whether read-only or read-write; or other secondary storage as would be known to those skilled in the art, may store instruction that upon execution by one or more processors cause the one or more processors to execute the steps in such functions and to provide such functionality.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system for determining a portfolio investment based on an application life cycle, comprising:
   a processor;
   a computer-readable non-transitory medium containing instructions executable by the processor, the medium comprising:
   a processor-implemented software module for receiving inputted information related to an application associated with a telecommunication or datacommunication product or service;
   a processor-implemented software module for receiving the inputted information and generating a plurality of matrices associated with phases of the application life cycle associated with the application;
   wherein the matrices comprise:
   an infrastructure build-out phase matrix comprising parameters related to a state of features of the product or service, wherein the parameters comprise evaluations of vendors offering the product or service, articles and messaging on a network related to the product or service, analyst projections related to the product or service, venture capital interest in the product or service, and standards related to the product or service;
   an application delivery phase matrix comprising parameters related to a state of support of the product or service, wherein the parameters comprise evaluations of markets for the product or service, service agreement differentiation related to the product or service, competition related to the product or service, and improvements in the product or service;
   an offer/promotion phase matrix comprising parameters related to a state of cost of the product or service, wherein the parameters comprise evaluations of offering differentiation related to the product or service, market availability of the product or service, competition related to the product or service, and market penetration related to the product or service; and
   a service evolution phase matrix comprising parameters related to a state of maturity of the product or service, wherein the parameters comprise evaluations of growth rates for the product or service, pricing of alternatives to the product or service, and new requirements related to the product or service;
   a processor-implemented software module for receiving the inputted information, applying the inputted information to one or more of the matrices, and determining a present point within the application life cycle associated with the application using a resulting score, wherein the inputted information is applied to successive matrices only if a threshold resulting score is exceeded; and
   an input/output interface for displaying resources for the telecommunication or datacommunication product or service responsive to the determined present point within the application life cycle associated with the application.

2. The processor-implemented system of claim 1, wherein the phases comprise an infrastructure build-out phase, an application delivery phase, an offer/promotion phase, and a service evolution phase.

3. The processor-implemented system of claim 2, further comprising:
   a processor-implemented software module for determining a plurality of parameters associated with each of the phases from the inputted information and assigning a weighting to each of the plurality of parameters.

4. The processor-implemented system of claim 3, further comprising:
   a processor-implemented software module for assigning a rating to each of the plurality of parameters and determining the resulting score based on a combination of the rating and the weighting for each of the plurality of parameters.

5. The processor-implemented system of claim 4, wherein the application comprises one of triple play, quadruple play, wireless data, wireless video, wireless voice, fixed wireless access, enterprise data, enterprise voice, video on demand, digital video recording, fiber-to-the-X, passive optical networking, residential data, voice over Internet Protocol, Internet Protocol television, social networking, and fixed-mobile convergence.

6. The processor-implemented system of claim 4, wherein:
   in the infrastructure build-out phase, the resources are allocated to mechanisms for feature enhancement on the product or service;
   in the application development phase, the resources are allocated to mechanisms for application support on the product or service;
   in the offer/promotion phase, the resources are allocated to mechanisms for cost reduction of the product or service; and
   in the service evolution, the resources are allocated to mechanisms for a new product or service.

7. A system for determining a portfolio investment based on an application life cycle, comprising:
- a processor;
- a computer-readable non-transitory medium containing instructions executable by the processor, the medium comprising:
- a processor-implemented software module for receiving inputted information from an input device related to an application associated with a telecommunication or datacommunication product or service and storing the inputted information in a memory;
- a processor-implemented software module for receiving the inputted information from the memory and generating a plurality of matrices associated with phases of the application life cycle associated with the application;
- wherein the matrices comprise:
- an infrastructure build-out phase matrix comprising parameters related to a state of features of the product or service, wherein the parameters comprise evaluations of vendors offering the product or service, articles and messaging on a network related to the product or service, analyst projections related to the product or service, venture capital interest in the product or service, and standards related to the product or service;
- an application delivery phase matrix comprising parameters related to a state of support of the product or service, wherein the parameters comprise evaluations of markets for the product or service, service agreement differentiation related to the product or service, competition related to the product or service, and improvements in the product or service;
- an offer/promotion phase matrix comprising parameters related to a state of cost of the product or service, wherein the parameters comprise evaluations of offering differentiation related to the product or service, market availability of the product or service, competition related to the product or service, and market penetration related to the product or service; and
- a service evolution phase matrix comprising parameters related to a state of maturity of the product or service, wherein the parameters comprise evaluations of growth rates for the product or service, pricing of alternatives to the product or service, and new requirements related to the product or service;
- a processor-implemented software module for receiving the inputted information from the memory, applying the inputted information to one or more of the matrices, and determining a present point within the application life cycle associated with the application using a resulting score, wherein the inputted information is applied to successive matrices only if a threshold resulting score is exceeded;
- an output device for outputting the determined present point within the application life cycle associated with the application; and
- an input/output interface for displaying resources for the telecommunication or datacommunication product or service responsive to the determined present point within the application life cycle associated with the application.

8. The processor-implemented system of claim 7, wherein the phases comprise an infrastructure build-out phase, an application delivery phase, an offer/promotion phase, and a service evolution phase.

9. The processor-implemented system of claim 8, further comprising:
- a processor-implemented software module for determining a plurality of parameters associated with each of the phases from the inputted information and assigning a weighting to each of the plurality of parameters.

10. The processor-implemented system of claim 9, further comprising:
- a processor-implemented software module for assigning a rating to each of the plurality of parameters and determining the resulting score based on a combination of the rating and the weighting for each of the plurality of parameters.

11. The processor-implemented system of claim 10, wherein the application comprises one of triple play, quadruple play, wireless data, wireless video, wireless voice, fixed wireless access, enterprise data, enterprise voice, video on demand, digital video recording, fiber-to-the-X, passive optical networking, residential data, voice over Internet Protocol, Internet Protocol television, social networking, and fixed-mobile convergence.

12. The processor-implemented system of claim 10, wherein:
- in the infrastructure build-out phase, the resources are allocated to mechanisms for feature enhancement on the product or service;
- in the application development phase, the resources are allocated to mechanisms for application support on the product or service;
- in the offer/promotion phase, the resources are allocated to mechanisms for cost reduction of the product or service; and
- in the service evolution, the resources are allocated to mechanisms for a new product or service.

* * * * *